May 3, 1960

J. H. EDMAN ET AL 2,935,147

HITCH DEVICE

Filed Aug. 1, 1955

INVENTORS.
JOHN H. EDMAN
CHARLES H. ARTUS
JOHN G. JOHNSON

ATTORNEYS

May 3, 1960
J. H. EDMAN ET AL
2,935,147
HITCH DEVICE
Filed Aug. 1, 1955
2 Sheets-Sheet 2
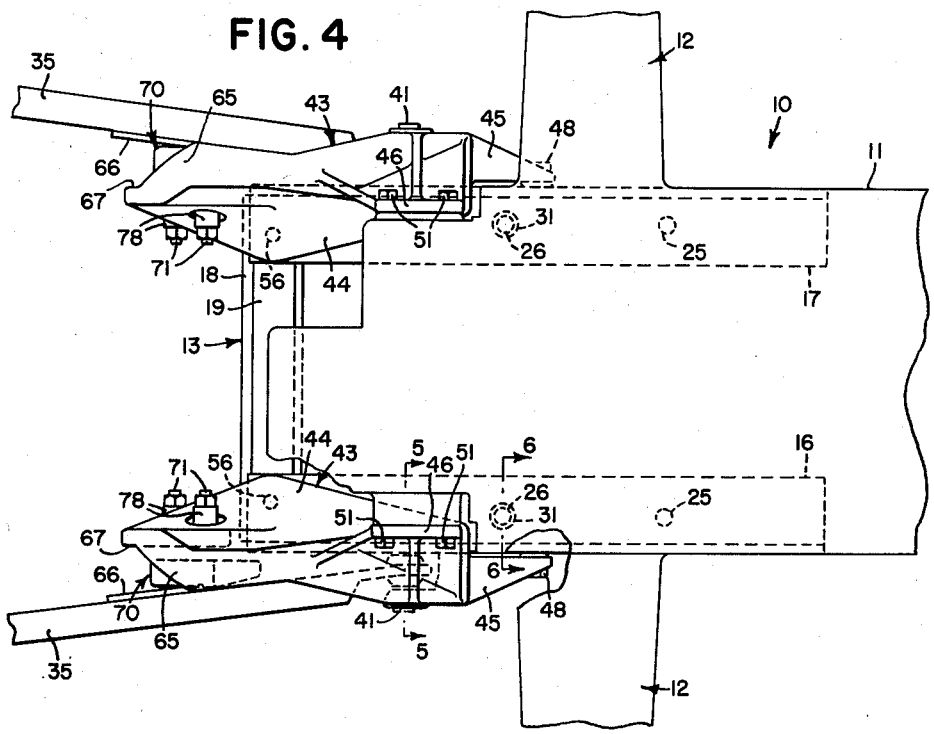
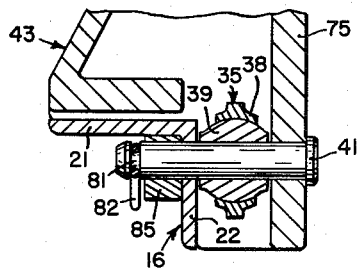
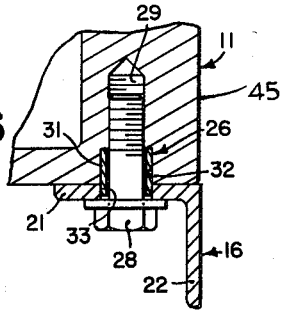
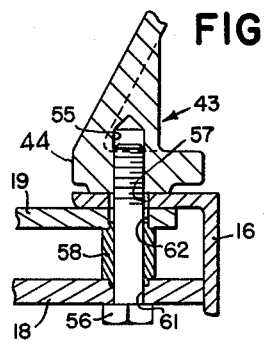
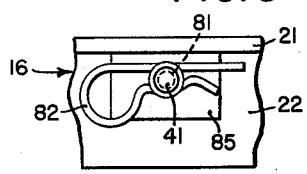
INVENTORS.
JOHN H. EDMAN
CHARLES H. ARTUS
JOHN G. JOHNSON
BY
ATTORNEYS

United States Patent Office 2,935,147
Patented May 3, 1960

2,935,147

HITCH DEVICE

John H. Edman, Cedar Falls, and Charles H. Artus and John G. Johnson, Waterloo, Iowa, assignors, by mesne assignments, to Deere & Company, a corporation of Delaware Application August 1, 1955, Serial No. 525,623

15 Claims. (Cl. 172—450)

The present invention relates generally to agricultural implements and more particularly to hitch connections for connecting an agricultural implement to a farm tractor.

The object and general nature of the present invention is the provision of hitch means, particularly adapted for tractors having swingable draft links and power lift apparatus connected with the draft links for raising and lowering the implement, so constructed and arranged that lateral swinging of the implement, when the latter is raised into a transport position as by the tractor power lift system, is limited or entirely prevented. More particularly, it is a feature of this invention to provide hitch means of this type, with the sway limiting means so constructed and arranged that, when desired, lateral swinging may be limited only in the raised position but permitted in the lowered position of the implement and the associated draft links.

A further feature of this invention is the provision of a hitch device having sway limiting means and, in addition thereto, other limiting means that prevents lateral swinging of the implement and the associated links not only in the raised position but also in the lowered or working position, and another feature of this invention is the incorporation in the aforesaid means of means to adjust the sway limiting means to accommodate different lateral positions of the rear ends of the draft links as, for example, when they are connected with one type of implement at relatively closely spaced points or to another type of implement at points spaced farther apart.

Still further, another feature of this invention is the provision of new and improved means connecting the sway limiting means to the tractor, and an additional feature of this invention is the provision of sway limiting means in the form of rigid members that also serve as at least a part of the means pivotally connecting the draft links with the tractor.

These and other objects and advantages of the present invention will be apparent to those skilled in the art after a consideration of the following detailed description, taken in conjunction with the accompanying drawings, in which:

Fig. 4 is plan view of the hitch structure shown in Fig. 1.

Fig. 5 is a sectional view, taken generally along the line 5—5 of Fig. 1, showing the pivotal connection between the right-hand draft link and the associated sway limiting member that is fixed to the rear portion of the tractor.

Fig. 6 is a sectional view taken along the line 6—6 of Fig. 4, showing one of the connections between the tractor drawbar support and the adjacent portion of the tractor.

Fig. 7 is a sectional view taken generally along the line 7—7 in Fig. 1.

Fig. 8 is a fragmentary side view of the structure shown in Fig. 5.

Figure 1:
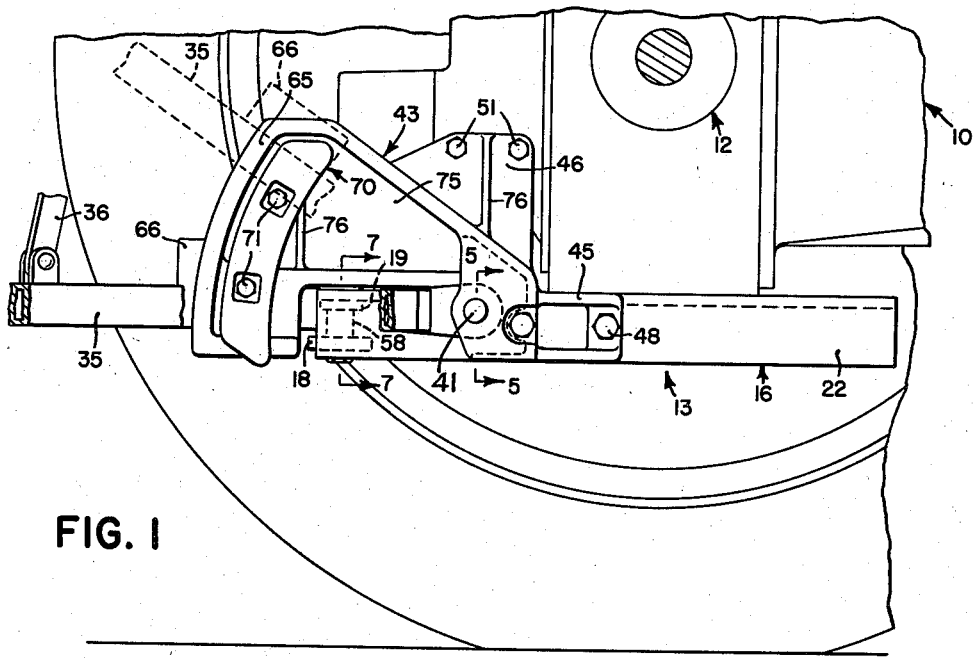
Fig. 1 is a side view, fragmentary in nature, showing hitch structure incorporating sway limiting means and associated parts, certain of which have been shown in section.
Figure 2:
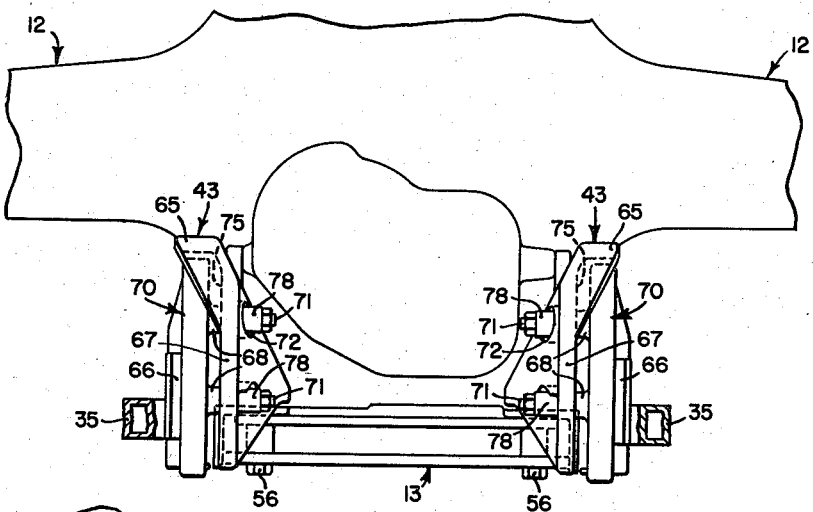
Fig. 2 is a rear view of the hitch structure shown in Fig. 1.

Referring first to Figs. 1, 2 and 4, the tractor to which the hitch device of the present invention is connected as indicated in its entirety by the reference numeral 10 and includes a main frame 11, which generally also includes the transmission and other parts of the tractor, and a rear axle structure that includes right and left hand lateraly outwardly extending rear axle sections 12. Secured to the lower portion of the rear end of the tractor is a drawbar support 13 that ordinarily receives the laterally swinging drawbar (not shown) of the tractor. The drawbar support 13 comprises right and left hand angle members 16 and 17 and a pair of rear cross members 18 and 19. The right and left hand members 16 and 17 preferably are in the form of angles, each having a horizontal flange 21 and a vertical flange 22, best shown in Fig. 6. Each of the angle members 16 and 17 is secured to the tractor by two fasteners 25 and 26, which may be of a suitable construction, each of the fasteners 25 and 26 preferably being in the form of cap screws 28 extending into tapped openings 29 formed in the rear axle 12 of the tractor body 11. According to the principles of the present invention, the fasteners 26 comprise not only the associated cap screw 28 but also a bushing in the form of a tubular dowel 31 seated in a suitably formed recess 32 in the tractor body 11 and extending into an opening 33 in the horizontal flange 21 of the angle 16. The dowel 31 forms a close fitting member and sustains in shear the draft loads imposed thereon, thus relieving the associated cap screw 28 of this stress, the cap screw 28 thus serving principally to clamp the angle member 16 to the lower portion of a tractor housing.

The drawbar support 13 also includes the rear cross bars 18 and 19 as mentioned and reference to these parts will be made below in connection with the mounting of the sway limiting cam members on the tractor.

An agricultural implement is adapted to be connected with the tractor 10 through a pair of generally horizontally arranged rearwardly extending draft links 35 the front end of each of which is adapted to be connected with the tractor. Each link receives the lower end of a lift link 36, the upper ends of the lift links being connected with the power lift system (not shown) of the tractor. For purposes of the present disclosure, the tractor power lift system, the lift links 36 and the draft links 35 may be similar to the corresponding parts shown in the patent to John H. Edman 2,721,508, issued October 25, 1955, to which reference may be made if desired.

According to the present invention, the forward ends of the draft links 35 are formed with spherical sections 38 encircling a ball connector 39 that is apertured to receive a draft pin 41. By virtue of this spherical mounting of the draft link ends 38 on the associated ball connectors, the links 35 are capable of both lateral and vertical swinging relative to the associated draft pins 41. The draft pins 41 are, according to the present invention, carried by and form a part of a pair of sway preventing members, each indicated in its entirety by the reference numeral 43.

Each of the sway limiting members 43 is preferably formed as a casting having a portion 44 (Figs. 4 and 7) that is seated on the rear part of the associated drawbar support 13 and a forward portion 45 (Fig. 4) that includes an upwardly extending portion 46 (Fig. 1), these two latter portions being connected to the drawbar support side angles and to the rear portion of the tractor respectively. The forward portions 45 are apertured to receive a transversely disposed securing cap screw 48 and the upwardly extending portion 46 is apertured to receive a pair of cap screws 51 that fasten this portion of the member 43 to the side of the tractor body. The extensions 44 are provided with tapped openings 55 (Fig. 7) into which cap screws 56 are adapted to be threaded. Each cap screw passes through the two bars 18 and 19 forming the rear portion of the drawbar support 13 and also through an opening 57 formed in the adjacent portion of the horizontal flange of the associated drawbar support angle, 16 or 17. The cross bars 18 and 19 are apertured at each end to receive the associated fastener 56, these apertures, shown at 61 and 62, being larger than the diameter of the shank of the associated cap screw 56, being thereby adapted to receive the end portions of an associated shouldered tubular bushing 58 through which the associated cap screw 56 passes, as best shown in Fig. 7. This construction provides for tightening each of the cap screws 56 the required amount but without danger of distorting the cross members 18 and 19 of the drawbar support 13, for the clamping stresses are taken largely on the ends of the associated bushing 58. Thus, the generally rear portion of each of the two members 43 is firmly and rigidly fastened to the rear portion of the tractor drawbar support 13.

The rear upper potrions of the sway limiting members 43 are provided with upwardly diverging sections 65 so spaced laterally that when the draft links 35 are in an elevated position, as shown in dotted lines in Fig. 1, rub plates 66 carried by and forming a part of the links 35 come into contact with and bear against the upper portions of the diverging sections 65 so that substatially all lateral movement of the links 35, when they are in their raised or dotted line position (Fig. 1), is prevented. However, when the draft links 35 are in their lowered position, the draft links 35 are opposite the more closely spaced portions 67 of the members, and hence a substantial amount of lateral swinging of the draft links 35 is permitted. Thus, the links 35 are adapted to receive an implement of the trailing type that, in operation, swings laterally relative to the tractor, as when turning, following contour lines or the like. As an example of an implement of this type a trailing plow may be mentioned. However, assuming that the plow is attached to the links 35 and other associate parts, when the power lift mechanism is operated the plow is lifted with the links 35, the rub plates 66 then engage the upper portions of the diverging section 65 so that, when the plow is completely raised, it is prevented from swinging laterally and thus is held against colliding with the tires of the rear wheels or other parts of the tractor during transport.

Other implements that are adapted to be connected with the tractor through the draft links 35 may be of such a character that lateral movement thereof relative to the tractor is not desirable, even in the lowered or operating position of the implement. Therefore, according to the principles of the present invention, we provide means whereby the sway limiting members 43 may be adapted to function to limit lateral swinging of the implement not only in the raised position of the implement but also in the working or lowered position. Referring first to Figs. 1 and 2, the aforesaid means comprises a pair of link-abutting members 70 that are adapted to be detachably and adjustably connected with the sway limiting members 43, respectively, in such a way that, as illustrated in Fig. 2, all sway or lateral shifting of the links 35 is prevented even though the links 35 and the associated implement are in a lowered position. Each member 70 is preferably in the form of a casting that is, as best shown in Fig. 1, detachably connected with the associated sway limiting member 43 by a pair of bolts 71 that extend through apertured bosses 68 formed at the innerside of each of the detachable link-abutting members 70.

Figure 3:
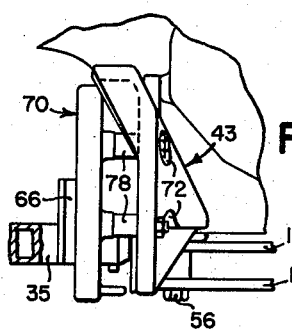
Fig. 3 is a fragmentary view similar to that shown in Fig. 2, but with the auxiliary sway limiting means being shown in its extended position in which the draft links are prevented from swinging laterally, both in their raised and in their lowered positions, when connected with implements having the wider spacing between their link-receiving means.

As will be seen from Figs. 1 and 2, each of the sway-preventing members 43, also formed as casting members, has a relatively vertical fore-and-aft extending rear wall section 75 reinforced by a vertical laterally outwardly extending rib 76 (Fig. 1), and the wall section 75 is apertured at 72 (Figs. 2 and 3) to receive the associated abutment-connecting bolts 71 that extend through the wall 75. Associated with each of the members 70 is a pair of bushings or spacers 78, and as will be seen from Figs. 2 and 4, when these bushings or spacers 78, which are tubular parts, are disposed at the innerside of the wall 75 (Fig. 2), the associated link-abutting member 70 is arranged on the tractor in a laterally inner position so as to accommodate implements having relatively narrow spacing between the lateral points at which the rear ends of the links 75 are connected with the implement. When implements having a wider spacing at the link-connecting points are used, the parts 70 are removed, together with the bushings 78 and the bolts 71, and then the bushings or spacers 78 are placed between each member 70 and the associated sway cam member 43, as shown in Fig. 3, which disposes the members 70 at laterally outwardly located positions, whereby implements having the wider attaching points are then held against lateral swinging relative to the tractor.

Referring now to Figs. 5 and 8, the inner end of each of the link-connecting pins 41 is provided with an annular groove 81 in which a detachable hairpin type connector 82 is disposed. The connector 82 is in the nature of a resilient element and since the annular groove 81 is continuous, the pin 41 may turn relative to the connector 82 without requiring that the latter turn also. It has been found, for example, that lateral and vertical swinging of the links 35, reacting against the pin 41 through the associated ball connector 39, sometimes tends to cause the pins 41 to rotate, and connectors of the type that are nonrotatably associated with the pin 41, such as an ordinary cotter key, for example, may become broken and fall out thus permitting the pin 41 to become disconnected. This disadvantage is not present where the connector 82 is so constructed and arranged that the rotation of the pin 41 is not hampered. Since the entire draft load is taken by the pins 41, the points where these pins pass through a vertical flange 22 of each of the associated drawbar angles 16, 17 are reinforced by blocks or members 85 which may be welded or otherwise fixed to the drawbar support angles 16 and 17 in any suitable way.

While we have shown and described the preferred structure in which the principles of the present invention have been incorporated, it is to be understood that our invention is not to be limited to the particular details, shown and described above, but that in fact, while the different means may be employed in the practice of the broader aspects of our invention.

What we claim and desire to secure by Letters Patent is:

1. In a hitch mechanism to connect an agricultural implement to a tractor, the combination of a pair of generally fore-and-aft extending laterally spaced apart draft links, means to connect the forward ends of said links to the tractor and accommodating both lateral and vertical swinging of said links relative to the tractor, a pair of sway cams attachable to the tractor and having means forming generally upwardly diverging cam portions adapted to engage the laterally inner sides of said links in the upper positions of the latter so as to limit lateral swinging of said draft links, additional abutment means engageable with said draft links for locking said links against lateral swinging in their lower positions, and means detachably securing said additional abutment means to said sway cams substantially at the outer sides thereof.

2. In a hitch mechanism to connect an agricultural implement to a tractor, the combination of a drawbar support on the tractor, a pair of generally fore-and-aft extending laterally spaced apart draft links, a pair of parts attached to said drawbar support in laterally spaced apart relation, each of said parts including a generally fore-and-aft extending member attached to a side of said drawbar support and having a rear upwardly and laterally outwardly extending cam section and a forward section spaced away from the adjacent portion of said support, the forward end of the associated draft link being disposed in said space, pivot means carried by each forward section and the adjacent portion of the drawbar support, and means swingably connecting the forward ends of said draft links with said pivot means and accommodating both lateral and vertical swinging of the associated draft links.

3. The invention set forth in claim 2, further characterized by an upwardly extending portion on each of said fore-and-aft extending members adjacent the front portion thereof and extending above said drawbar support, and means extending through said upwardly extending portions for fixing said members directly to the tractor.

4. In a hitch mechanism to connect an agricultural implement to a tractor, the combination of a pair of generally fore-and-aft extending laterally spaced apart draft links, structure fixed to the tractor and including means swingably receiving the forward ends of said links and accommodating both lateral and vertical swinging of said links relative to the tractor, and said structure carrying a pair of motion-limiting parts engageable with said links at points spaced from their connection with said structure, said parts including cam means upwardly and laterally angled and engageable with the side of said links so as to limit lateral swinging thereof when said links are raised.

5. In a hitch mechanism to connect an agricultural implement to a tractor, the combination of a pair of generally fore-and-aft extending laterally spaced apart draft links, means to connect the forward ends of said links to the tractor and accommodating both lateral and vertical swinging of said links relative to the tractor, a pair of sway cams attachable to the tractor and having means forming generally upwardly extending laterally angled cam portions adapted to engage the sides of said links in the upper positions of the latter so as to limit lateral swinging of said draft links only when the latter are raised, additional abutment means disposed generally below the upper parts of said cam portions and engageable with said draft links for locking said links against lateral swinging in their lower positions, and means detachably securing said additional abutment means to said sway cams and disposing said abutment means at the outer sides of the sway cams.

6. In a hitch mechanism to connect an agricultural implement to a tractor, the combination of a pair of generally fore-and-aft extending laterally spaced apart draft links having a normal working position and adapted to be raised into an upper position to lift the associated implement into a transport position, and a pair of sway cams attachable to the tractor and each comprising an integral part having a forward part disposed generally in the plane of said working position and pivotally receiving the forward ends of said draft links accommodating both lateral and vertical swinging of said links, each of said sway cams also having, rearwardly of said forward part, an upwardly disposed laterally outwardly angled cam portion lying above said normal working position and shaped at the upper portion thereof engage said links rearwardly of their forward ends so as to limit lateral swinging of said draft links in the raised position of the latter.

7. In a hitch mechanism to connect an agricultural implement to a tractor, the combination of a pair of generally fore-and-aft extending laterally spaced apart draft links, a pair of sway cams attachable to the tractor, each cam having a lower fore-and-aft extending portion and a rear generally upwardly extending cam portion angled in a generally transverse direction and located generally above the normal working position of the associated draft link, a draft pin and pin-receiving means on the forward portion of each of said sway cams to pivotally receive the forward end of the associated draft link, said pin-receiving means including portions lying on both sides of the associated draft link, and means fixing each of said sway cams to the tractor including means extending through the forward portion of each sway cam.

8. In a hitch mechanism to connect an agricultural implement to a tractor, the combination of a drawbar support on the tractor, said support comprising a pair of generally fore-and-aft extending bars adapted to be fixed to the tractor in laterally spaced apart relation, a pair of generally fore-and-aft extending laterally spaced apart laterally and vertically swingable draft links, a pair of draft link supports attached, respectively, to the fore-and-aft extending bars of said drawbar support in laterally outwardly spaced relation with respect to said bars, each of said draft link supports comprising a generally fore-and-aft extending structure having a generally upwardly extending link-engaging cam portion at the rear of said link support and pivot means at the forward end of said link support swingably receiving the forward end of the associated draft link and accommodating both lateral and vertical swinging thereof relative to the tractor, said cam portions lying above the normal working position of said draft links, whereby said cam portions are adapted to engage said links when the latter are disposed above their normal working position and prevent lateral displacement of said links, the latter being swingable laterally when the links are in their lower position lying below said cam portions, and sway lock means attachable to the rear portions of said draft link supports and extending generally laterally outwardly of said cam portions and engageable with said links to prevent lateral movement of said links in their lower position.

9. The invention set forth in claim 8, further characterized by said drawbar support bars and the adjacent forward portions of said draft link supports having aligned pivot pin receiving openings, said pivot means including link-receiving pivot pins disposed in said aligned openings whereby the pivot pins are supported partly on the drawbar support bars and partly on said draft link supports.

10. In a hitch mechanism to connect an agricultural implement to a tractor, the combination of a drawbar support on the tractor, said drawbar support comprising a pair of laterally spaced apart fore-and-aft extending members and a pair of vertically spaced apart bars disposed transversely at the rear ends of said drawbar support members and having aligned apertures, a pair of generally fore-and-aft extending laterally spaced apart draft links, a pair of generally fore-and-aft extending sway limiting parts having rear portions mounted on said drawbar support members adjacent their rear ends and forward portions pivotally receiving said links, fastening means extending through the apertures in said transverse bars for fixing the rear portions of said fore-and-aft extending parts to said drawbar support members, respectively and including portions overlying the end portions of said transverse bars, and a bushing disposed about each of said fastening means and disposed between said transverse bars to sustain clamping pressure when said fastening means are tightened.

11. The invention set forth in claim 10, further characterized by said bushings having ends socketed in recesses in said transverse bars.

12. In a hitch mechanism to connect an agricultural implement to a tractor, the combination of a pair of generally fore-and-aft extending laterally spaced apart draft links, structure fixed to the tractor and including means swingably receiving the forward ends of said links and accommodating both lateral and vertical swinging of said links relative to the tractor, said structure comprising a pair of sway cam members, each having a lower fore-and-aft extending portion and a rear generally upwardly extending cam portion angled in a generally transverse direction and located generally above the normal working position of said draft links, said cam portions being engageable with said links in their raised position to limit lateral movement thereof, a pair of sway locks, and means detachably connecting the latter with said sway cam members so as to dispose the sway locks on the outside of said cam members and extending generally below said cam portions for eliminating lateral movement of said links in their lowered position.

13. In a hitch mechanism to connect an agricultural implement to a tractor, the combination of a pair of generally fore-and-aft extending laterally spaced apart draft links, a pair of sway cams attachable to the tractor and having means forming generally upwardly and laterally angled cam portions adapted to engage the adjacent sides of the associated draft links in the upper positions of the latter so as to limit lateral swinging of said draft links when the latter are in their upper positions, and means including a draft pin and pin-receiving means on each of said sway cams to pivotally receive the forward end of the associated draft link for both lateral and vertical swinging, means on the tractor aligned with the pin-receiving means on each sway cam and apertured to receive the inner end of the associated pin, said draft pin being rotatable in said tractor-carried means and in said sway cam and said draft link, and means rotatably connected with said pin and engageable with said tractor-carried means to hold the pin in position in the associated sway cam.

14. In a hitch mechanism to connect an agrciultural implement to a tractor, the combination of a pair of generally fore-and-aft extending laterally spaced apart draft links, a pair of sway cams attachable to the tractor, each having a lower fore-and-aft extending portion and a rear generally upwardly extending cam portion angled in a generally transverse direction and located generally above the normal working position of said draft links, a draft pin and pin-receiving means on the forward portion of each of said sway cams to pivotally receive the forward end of the associated draft link, and means fixing each of said sway cams to the tractor so as to dispose said link-engaging cam portions generally rearwardly of the axes of lateral swinging of said draft links.

15. In a hitch mechanism to connect an agricultural implement to a tractor, the combination of a pair of generally fore-and-aft extending laterally spaced apart draft links having a normal working position and adapted to be raised into an upper position to lift the associated implement into a transport position, and a pair of sway cams attachable to the tractor and each comprising a part having a forward portion disposed generally in the plane of said working position and pivotally receiving the forward ends of said draft links so as to accommodate both lateral and vertical swinging of said links, each of said sway cams also having, rearwardly of said forward portion, an upwardly disposed laterally angled cam portion lying above said normal working position and shaped adjacent the upper portion thereof to engage said links rearwardly of their forward ends so as to limit lateral swinging of said draft links in the raised position of the latter, and sway locks attachable in selected lateral positions to the rear portions of said sway cams to prevent lateral swinging of said draft links in the lower positions thereof.

References Cited in the file of this patent
UNITED STATES PATENTS

| | | |
|---|---|---|
| 2,145,007 | Foster | Jan. 24, 1939 |
| 2,513,783 | Blessinger | July 4, 1950 |
| 2,611,304 | Toland | Sept. 23, 1952 |
| 2,646,713 | Summerbell | July 28, 1953 |
| 2,660,938 | Kaupke | Dec. 1, 1953 |
| 2,707,424 | Marvin | May 3, 1955 |
| 2,731,898 | Frevik et al. | Jan. 24, 1956 |
| 2,783,058 | Skibbe | Feb. 26, 1957 |